United States Patent
Wang et al.

(10) Patent No.: US 11,851,340 B2
(45) Date of Patent: Dec. 26, 2023

(54) METHOD FOR PREPARING POTASSIUM CHLORIDE FROM CARNALLITE

(71) Applicant: QINGHAI INSTITUTE OF SALT LAKES, CHINESE ACADEMY OF SCIENCES, Xining (CN)

(72) Inventors: Min Wang, Xining (CN); Lijie Shi, Xining (CN)

(73) Assignee: QINGHAI INSTITUTE OF SALT LAKES, CHINESE ACADEMY OF SCIENCES, Xining (CN)

(*) Notice: Subject to any disclaimer, the term of this patent is extended or adjusted under 35 U.S.C. 154(b) by 0 days.

(21) Appl. No.: 17/997,824

(22) PCT Filed: Apr. 30, 2021

(86) PCT No.: PCT/CN2021/091293
§ 371 (c)(1),
(2) Date: Nov. 3, 2022

(87) PCT Pub. No.: WO2021/223668
PCT Pub. Date: Nov. 11, 2021

(65) Prior Publication Data
US 2023/0192502 A1  Jun. 22, 2023

(30) Foreign Application Priority Data
May 6, 2020 (CN) .......................... 202010371560.3

(51) Int. Cl.
    C01D 3/06  (2006.01)
(52) U.S. Cl.
    CPC ...................... *C01D 3/06* (2013.01)
(58) Field of Classification Search
    CPC ...................................................... C01D 3/06
    (Continued)

(56) References Cited

U.S. PATENT DOCUMENTS 1,432,796 A * 10/1922 Silsbee .................... C01D 3/06
                                                           23/297
3,644,102 A    2/1972 Svanoe
(Continued)

FOREIGN PATENT DOCUMENTS

CN    1094466 C    11/2002
CN    1424486 A     6/2003
(Continued)

OTHER PUBLICATIONS

Liu Xiaoli, The Application Research of Drilling Solution Mining for the Carnallite Deposits, Mining R&D, 2017, pp. 4-7, vol. 37, No. 9.

(Continued)

*Primary Examiner* — Melissa S Swain
(74) *Attorney, Agent, or Firm* — Bayramoglu Law Offices LLC

(57) ABSTRACT

A method for preparing potassium chloride from carnallite includes: carrying out high-temperature water solution mining treatment on carnallite with fresh water to obtain potassium-rich saturated brine; mixing the potassium-rich saturated brine, a sylvine saturated solution, and bittern for mixing brine, evaporation and decomposition to obtain artificial sylvine; and carrying out low-temperature selective dissolution treatment on the artificial sylvine with fresh water to prepare potassium chloride. The carnallite is mined by using hot water, which reduces the content of sodium chloride in the potassium-rich saturated brine; artificial sylvine is only subjected to low-temperature selective dissolution once, which avoids unnecessary energy consumption and impurity accumulation unnecessary for multifold cycles of thermal dissolution-cold crystallization treatment of sylvine while guaranteeing the high yield and high quality of potassium chloride. The method is suitable for different grades of carnallite, has extremely strong adaptability and (Continued)

loose technical conditions, and is conducive to promotion and implementation.

12 Claims, 4 Drawing Sheets

(58) Field of Classification Search
USPC .......................................................... 423/208
See application file for complete search history.

(56) References Cited

U.S. PATENT DOCUMENTS

| | | | | |
|---|---|---|---|---|
| 2008/0220127 | A1* | 9/2008 | Zuniga | C01D 3/08 |
| | | | | 426/471 |
| 2016/0130682 | A1* | 5/2016 | Bakke | C22B 26/10 |
| | | | | 423/208 |

FOREIGN PATENT DOCUMENTS

| | | |
|---|---|---|
| CN | 1490246 A | 4/2004 |
| CN | 1608995 A | 4/2005 |
| CN | 1248966 C | 4/2006 |
| CN | 1872686 A | 12/2006 |
| CN | 101109278 A | 1/2008 |
| CN | 101353175 A | 1/2009 |
| CN | 101412524 A | 4/2009 |
| CN | 101462743 A | 6/2009 |
| CN | 102434141 A | 5/2012 |
| CN | 102491373 A | 6/2012 |
| CN | 101402462 B | 8/2012 |
| CN | 102442687 B | 4/2014 |
| CN | 104058427 A | 9/2014 |
| CN | 104529562 A | 4/2015 |
| CN | 104291359 B | 12/2015 |
| CN | 107572552 A | 1/2018 |
| CN | 107827126 A | 3/2018 |
| CN | 107903138 A | 4/2018 |
| CN | 106830013 B | 9/2018 |
| CN | 107188200 B | 7/2019 |
| CN | 111362730 A | 7/2020 |
| CN | 111470519 A | 7/2020 |
| CN | 111533138 A | 8/2020 |
| DE | 102013012608 A1 | 1/2015 |
| WO | WO-2011158260 A1 * | 12/2011 ............. A23L 27/40 |

OTHER PUBLICATIONS

Li Xinghai, et al., Experimental study on preparation of sylvite from low-grade potassium resources, Inorganic Chemicals Industry, 2018, pp. 51-53, vol. 50, No. 7.

* cited by examiner

METHOD FOR PREPARING POTASSIUM CHLORIDE FROM CARNALLITE

CROSS REFERENCE TO RELATED APPLICATION

This patent application is the national phase entry of International Application No. PCT/CN2021/091293, filed on Apr. 30, 2021, which is based upon and claims the benefit and priority of Chinese Patent Application No. 202010371560.3 filed on May 6, 2020, and entitled "METHOD FOR PREPARING POTASSIUM CHLORIDE FROM CARNALLITE", the disclosure of which is incorporated by reference herein in its entirety as part of the present application.

TECHNICAL FIELD

The present application belongs to the technical field of inorganic salt industry, and particularly relates to a method for preparing potassium chloride from carnallite.

BACKGROUND

A potassium fertilizer is a basic substance material for stable growth of grain production, which can effectively promote the quality of agricultural products and improve the stress resistance of crops, and is one of nutrients necessary for growth of crops. As cultivated areas decrease and populations increasingly grow, it is of a great food safety significance to develop potassium resources on large scale and improve the yield of the potassium fertilizer.

The potassium fertilizer products are mainly potassium chloride fertilizers accounting for more than 90% of the total amount of potassium fertilizers. Raw materials for preparing the potassium chloride fertilizers mainly include sylvine and carnallite, wherein carnallite is sodium chloride-containing carnallite. With the long-term large-scale development, the grade of carnallite is gradually reduced, and the buried depth gradually declines, so as to increase the difficulty for mining and preparation of carnallite.

At present, methods for preparing potassium chloride from carnallite mainly include:

(1) cold decomposition-washing method: the process of this technology is that carnallite is completely decomposed to obtain artificial sylvine, and then a finished product potassium chloride is obtained by directly washing with water and drying. However, this technology is only suitable for carnallite having extremely low NaCl content. Furthermore, the amount of added water is increased with the increase of the content of NaCl, but the yield of KCl is gradually reduced, so this technology has been eliminated;

(2) cold decomposition-flotation method: the process of this technology is that carnallite is completely decomposed with fresh water to refined potassium mother liquor to obtain artificial sylvine, then flotation is carried out using a direct flotation collecting agent (mainly an amine collecting agent), a solid phase after being floated is washed with water and dried to obtain the finished product potassium chloride. The flowchart of this technology is seen in FIG. 1. This technology is similarly suitable for carnallite mixed with sylvine (patent CN1094466C). Further, in patent CN102442687B, a rotary decomposer is used for cold decomposition, the crude particles NaCl are selectively graded and separated, and the rest ore pulp is floated to obtain qualified KCl refined ore; in patent CN107188200B, a multi-stage screening system is used to separate cold decomposed slurry to obtain crude particle NaCl, crude particle KCl and fine particle KCl slurry in sequence, and the fine particle KCl slurry is floated and separated to obtain KCl refined ore; these two technologies greatly improve the product quality of potassium chloride. Although production of potassium chloride with these technologies is energy-saving and less in plant construction investment, simple and easy to grasp, the obtained products have fine particle size, poor physical property and low yield which is generally 50%-60%. The product has poor physical property, and the products with a particle size of greater than 100 meshes are only 10%-20% of the whole products, which is gradually difficult to meet the requirements of the international market. This technology is greatly affected by the types of carnallite. When the content of NaCl in carnallite is high, the grade and yield of KCl will be reduced;

(3) reverse flotation-cold crystallization method: the process of this technology is that first, carnallite is subjected to reverse flotation to remove NaCl to obtain low-sodium carnallite, then low-sodium carnallite is subjected to cold decomposition followed by screening, filtering, washing and drying, so as to obtain a potassium chloride product. The process of this technology is seen in FIG. 2. On the basis of the original process, in patents CN104058427A and CN107572552A, a screening system is introduced before reverse flotation to preferentially screen out large-particle NaCl and further reduce the content of NaCl in low-sodium carnallite, thereby ensuring the stable operation of cold crystallization. Although the potassium chloride product produced by this technology has high quality which can be up to about 95%, and the product has a coarse particle size and a good appearance effect. However, its process is relatively complicated, difficult to operate (especially for a crystallization system), high in raw ore requirements and strong in dependence;

(4) brine mixing-rate-controlled crystallization method: this technology is to mix mother liquor (carnallite saturation point) in which potassium chloride, sodium chloride and carnallite are jointly saturated with mother liquor (bischofite saturation point) in which magnesium chloride, sodium chloride and carnallite are jointly saturated. Low-sodium carnallite is precipitated out due to oversaturation of potassium and magnesium, concentrated to remove liquid to enter a crystallizer, and high-grade potassium chloride is obtained after crystals are decomposed with fresh water, the process of the brine mixing method can be seen in FIG. 3. In CN1248966C, low-sodium carnallite is obtained by using a brine mixing technology, and then the potassium chloride product is obtained. Although this technology has obvious advantages of simple process flow, excellent product quality, low capital construction investment, low production cost, high operation recovery rate, high resource utilization rate and no environmental pollution, this technology uses decomposition mother liquor as a raw material, so the production scale cannot be expanded at will and can only be attached to large flotation plants, with low yield;

(5) solar evaporation method: the process of this technology is that the carnallite obtained by solar evaporating intercrystalline brine is dissolved with fresh water and then discharged into a potash pond. First, potassium chloride is precipitated out alone in the potash pond. When the brine in the potash pond is concentrated so that sodium chloride is saturated, at this moment, the brine is sylvine point brine, the sylvine point brine is returned back to the intercrystalline brine to be solar evaporated for recycling. The technical process of the solar evaporation method can be seen in FIG. 4. Although the solar evaporation method makes full use of solar energy without adding any chemicals, the quality of the obtained product is good, the precipitated potassium chloride has a particle size of generally above 0.2 mm and high purity, but the yield is low and is greatly affected by climatic conditions;

(6) cold decomposition-thermal dissolution-cold crystallization method: the process of this technology is that carnallite is completely decomposed with fresh water to obtain artificial sylvine, then sodium chloride in the artificial sylvine is removed by thermal dissolving with fresh water according to a principle that the solubility of sodium chloride and potassium chloride has different variation trends with temperatures, and then the mother liquor is cooled and crystallized to obtain potassium chloride. The flowchart of this technology can be seen in FIG. 5. Although the potassium chloride product obtained by this technology has large and uniform particle size, good physical properties, high product purity, high potassium recovery rate, and low equipment investment, but large energy consumption, high cost, serious equipment corrosion and complicated process operation, and therefore technology is ordinarily properly popularized in areas where energy is cheap;

(7) leaching mining method: for solid carnallite or low-grade ore deposits that are difficult to mine, patents CN101402462B, CN104291359B and CN106830013B utilize different concentrations of $MgCl_2$ solvents to carry out room temperature leaching mining of solid carnallite to obtain potassium-containing brine. The potassium-containing brine is evaporated to obtain carnallite, and then the potassium chloride product is prepared. This technology is mainly aimed at low-grade solid deposits. At the same time, room-temperature leaching mining is carried out using $MgCl_2$ solvent, leached brine needs months or even years to reach equilibrium with slow mining rate; and this technology is affected by the liquid-solid ratio and the composition of the deposit, the dissolved brine has high sodium chloride content so as to affect the quality of the prepared potassium chloride product.

To sum up, the existing technology for preparing potassium chloride from carnallite is closely related to the grade of carnallite. How to realize the development and utilization of potassium resources in carnallite without considering the grade of carnallite is an urgent problem to be solved.

SUMMARY

The main objective of the present application is to provide a method for preparing potassium chloride from carnallite to overcome the defects in the existing technology.

In order to achieve the above objective, the technical solution adopted by the present application includes:

The embodiments of the present application provide a method for preparing potassium chloride from carnallite, comprising:

carrying out high-temperature water solution mining treatment on carnallite with fresh water to obtain potassium-rich saturated brine;

mixing the potassium-rich saturated brine, a sylvine saturated solution and bittern for mixing brine, evaporation and decomposition to obtain artificial sylvine; and carrying out low-temperature selective dissolution treatment on the artificial sylvine with fresh water to prepare potassium chloride.

In some specific embodiments, the method specifically comprises:

(1) contacting preheated fresh water with carnallite for high-temperature water solution mining treatment to obtain potassium-rich saturated brine, wherein the temperature of the potassium-rich saturated brine is 40° C.-50° C.;

(2) mixing the potassium-rich saturated brine, the sylvine saturated solution and the bittern at 40° C.-50° C. for mixing brine to obtain carnallite saturated brine and sodium chloride;

(3) evaporating the carnallite saturated brine at 40° C.-50° C., and then carrying out solid-liquid separation to obtain low-sodium carnallite and bittern;

(4) carrying out fresh water decomposition treatment on the low-sodium carnallite at 10° C.-25° C., and then carrying out solid-liquid separation to obtain artificial sylvine and a carnallite saturated solution; and (5) carrying out low-temperature selective dissolution treatment on the artificial sylvine with fresh water at 10° C.-25° C. to obtain crude potassium chloride and a sylvine saturated solution, and then refining to obtain potassium chloride.

In the present application, (1) carnallite is mined by a fresh water high-temperature water solution method, which greatly improves the mining speed of carnallite; (2) the mass ratio of fresh water to carnallite in the process of water solution mining is seriously controlled, so that the potassium resource in carnallite is sufficiently dissolved while reducing the content of sodium chloride in potassium-rich saturated brine to the greatest extent; (3) bittern is added for mixing the potassium-rich saturated brine obtained through water solution mining to precipitate out sodium chloride, so as to omit halite and sylvine sections experienced by evaporation of potassium-rich saturated brine to quickly obtain low-sodium carnallite saturated brine so that potassium in potassium-rich saturated brine is precipitated out only in a form of carnallite; (4) the ratio of mixing bittern is controlled, the used bittern is obtained by evaporation in a later stage instead of separate preparation, thereby avoiding environmental hazards caused by discharge of bittern; (5) based on compositions of artificial sylvine, low-temperature selective dissolution is adopted only once to prepare potassium chloride, that is to say, the yield of potassium chloride in this stage is up to 70%-80% without using cyclic thermal dissolution-cold crystallization again.

Compared with the prior art, the present application has the beneficial effects:

(1) The present application adopts a certain proportion of hot water mining, which can reduce the content of sodium chloride in potassium-rich saturated brine to the maximum extent while rapidly mining carnallite.

(2) The potassium-rich saturated brine in the present application adopts a "bittern mixing-evaporation" technology, which not only rapidly separates sodium chloride to obtain low-sodium carnallite, but also realizes the reuse of bittern to avoid the environmental harm caused by discharge of bittern.

(3) In the present application, the artificial sylvine is subjected to low-temperature selective dissolution only once to prepare potassium chloride, thereby avoiding energy consumption and impurity accumulation unnecessary for multiple cycles of thermal dissolution-cold crystallization treatment of sylvine while guaranteeing the high yield and high quality of potassium chloride.

(4) The method provided in the present application is applicable to different grades of carnallite, which is strong in adaptability, loose in technical conditions, and conducive to promotion and implementation of this technology.

BRIEF DESCRIPTION OF THE DRAWINGS

For more clearly illustrating the embodiments of the present application or technical solution in the prior art, drawings required to be used in the embodiments or the prior art will be simply discussed below. Obviously, the drawings described below are only some embodiments in the present application, and other drawings can be obtained according to these drawings by persons of ordinary skill in the art without creative efforts.

DETAILED DESCRIPTION OF THE EMBODIMENTS

Figure 1:
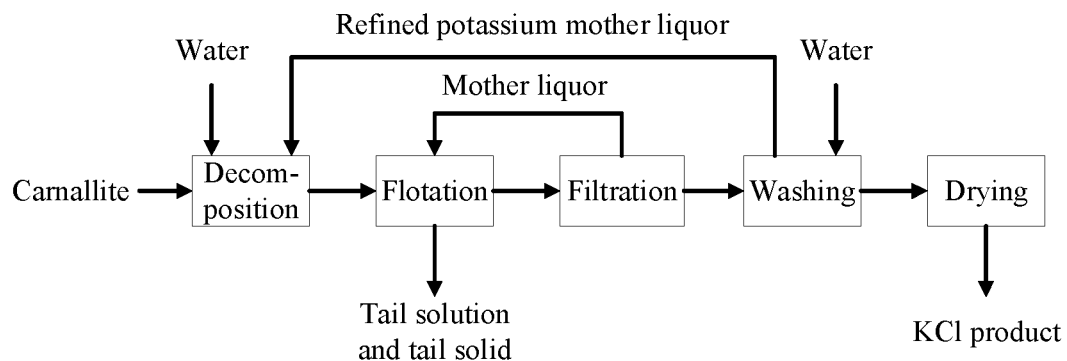
FIG. 1 is a technical flowchart of a cold decomposition-flotation method in the prior art.
Figure 2:
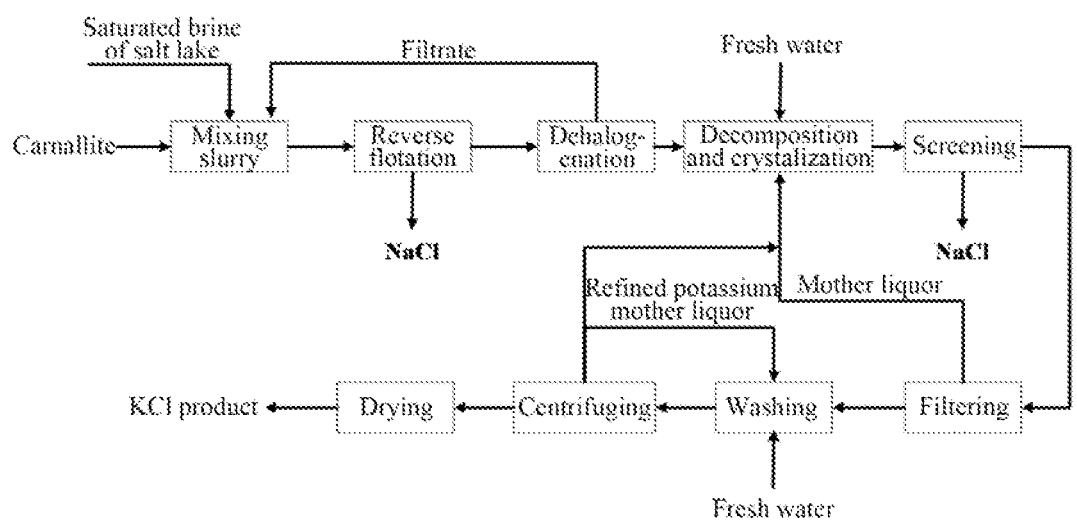
FIG. 2 is a technical flowchart of a reverse flotation-cold crystallization method in the prior art.
Figure 3:
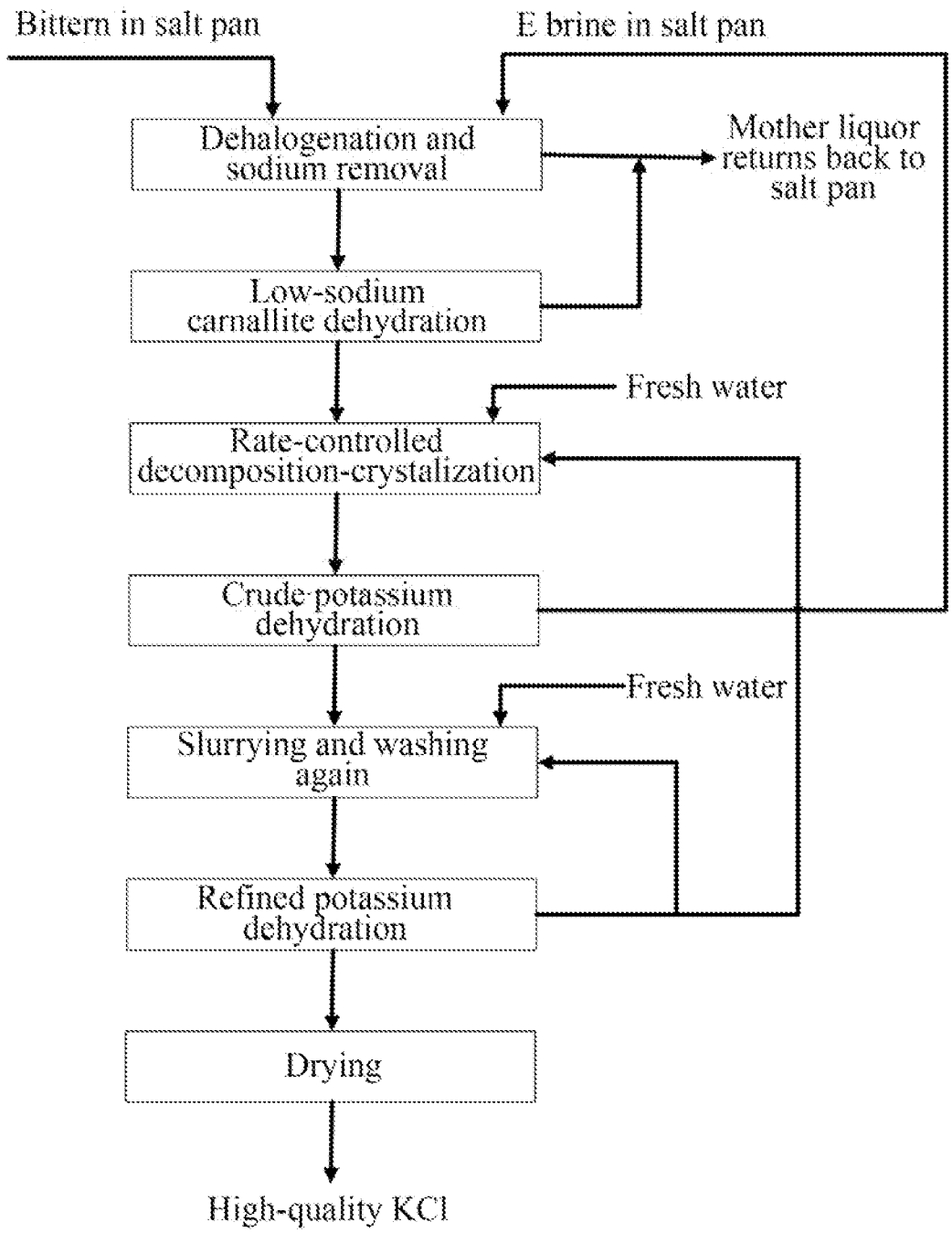
FIG. 3 is a technical flowchart of a brine mixing-rate-controlled crystallization method in the prior art.
Figure 4:
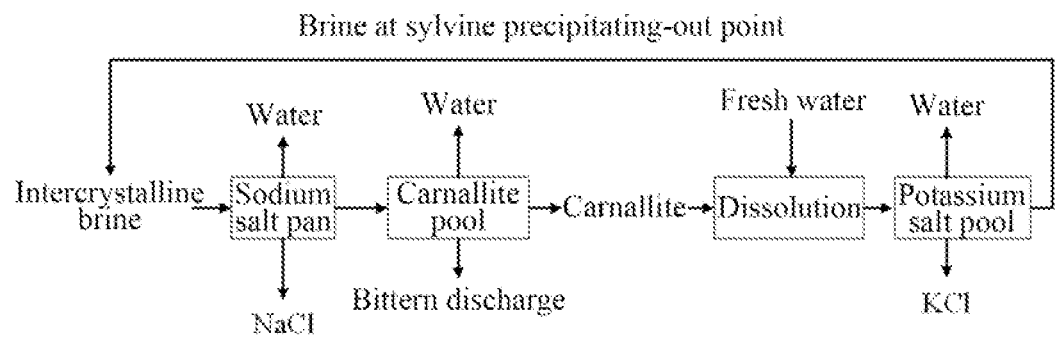
FIG. 4 is a technical flowchart of a solar evaporation method in the prior art.
Figure 5:
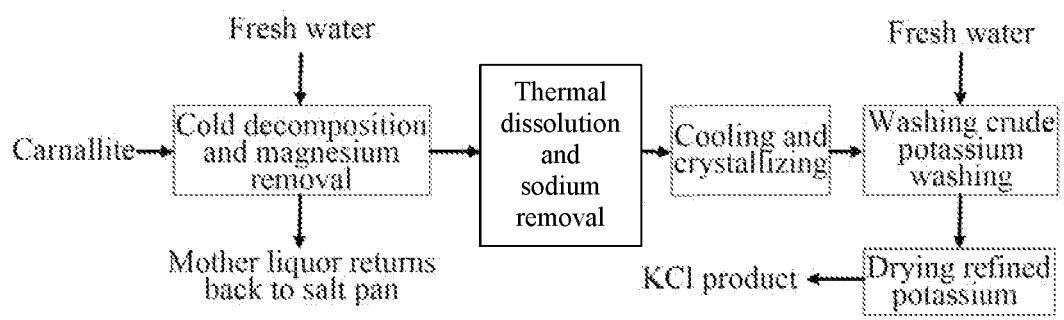
FIG. 5 is a technical flowchart of a cold decomposition-thermal dissolution-cold crystallization method in the prior art.

In view of the defects in the prior art, after long-term research and a lot of practice, the inventor of the present application puts forward the technical scheme of the present application, which adopts the high-temperature water-soluble method to mine carnallite, and combines the brine mixing, evaporation and other processes to produce potassium chloride with high efficiency and quality, so as to realize the development and utilization of potassium resources in various kinds of carnallite.

Next, the technical solution of the present application will be clearly and completely described, obviously, the described embodiments are some embodiments of the present application but not all the embodiments. Based on the embodiments of the present application, other embodiments obtained by persons of ordinary skill in the art without creative efforts all fall within the protective scope of the present application.

One aspect of the embodiments of the present application provides a method for preparing potassium chloride from carnallite, comprising:

carrying out high-temperature water solution mining treatment on carnallite with fresh water to obtain potassium-rich saturated brine;

mixing the potassium-rich saturated brine, a sylvine saturated solution and bittern for mixing brine, evaporation and decomposition to obtain artificial sylvine; and carrying out low-temperature selective dissolution treatment on the artificial sylvine with fresh water to prepare potassium chloride.

In some specific embodiments, the method for preparing potassium chloride from carnallite specifically comprises:

(1) contacting preheated fresh water with carnallite for high-temperature water solution mining treatment to obtain potassium-rich saturated brine, wherein the temperature of the potassium-rich saturated brine is 40° C.-50° C.; through hot water preheating treatment, the temperature of the obtained potassium-rich saturated brine reaches 40° C.-50° C.;

(2) mixing the potassium-rich saturated brine, the sylvine saturated solution and the bittern at 40° C.-50° C. for mixing brine to obtain carnallite saturated brine and sodium chloride;

(3) evaporating the carnallite saturated brine at 40° C.-50° C., and then carrying out solid-liquid separation to obtain low-sodium carnallite and bittern;

(4) carrying out fresh water decomposition treatment on the low-sodium carnallite at 10° C.-25° C., and then carrying out solid-liquid separation to obtain artificial sylvine and a carnallite saturated solution; and (5) carrying out low-temperature selective dissolution treatment on the artificial sylvine with fresh water at 10° C.-25° C. to obtain crude potassium chloride and a sylvine saturated solution, and then refining to obtain potassium chloride.

In some specific embodiments, the potassium-rich brine in step (1) comprises the following components in percentage by weight: 7 wt %-11 wt % of NaCl, 7.5 wt %-9.5 wt % of KCl, and 11 wt %-15.5 wt % of $MgCl_2$.

Further, a mass ratio of the fresh water to the carnallite is 0.25:1-1.20:1.

Further, the mass ratio of the fresh water to the carnallite decreases with the increase of the content of sodium chloride in carnallite.

Still further, in the process of water solution mining, the mass ratio of the fresh water to the carnallite is reduced by 0.15-0.20 when the content of sodium chloride in carnallite increases by 10 wt %. In some specific embodiments, the carnallite saturated brine in step (2) comprises the following components in percentage by weight: 1.6 wt %-1.8 wt % of NaCl, 4.0 wt %-4.5 wt % of KCl, and 26.5 wt %-27.0 wt % of $MgCl_2$.

Further, a ratio of a total mass of the potassium-rich saturated brine and the sylvine saturated solution to a mass of bittern is 1:1.1-1:1.7.

Still further, the higher the content of sodium chloride in the potassium-rich saturated brine and the sylvine saturated solution, the more the amount of the bittern.

In some specific embodiments, the low-sodium carnallite in step (3) comprises the following components in percentage by weight: 9 wt %-10 wt % of NaCl, 20 wt %-22 wt % of KCl, and 32 wt %-35 wt % of $MgCl_2$.

Further, the bittern in step (3) comprises the following components in percentage by weight: 0.4 wt %-0.5 wt % of NaCl, 0.20 wt %-0.25 wt % of KCl, and 36 wt %-37 wt % of $MgCl_2$.

Further, the method also comprises: recovering the bittern obtained in step (3) for mixing brine in step (2).

In some specific embodiments, the method also comprises: the artificial sylvine in step (4) comprises the following components in percentage by weight: 25 wt %-30 wt % of NaCl and 70 wt %-75 wt % of KCl.

Further, the carnallite saturated solution comprises the following components in percentage by weight: 1.5 wt %-2.0 wt % of NaCl, 2.5 wt %-3.5 wt % of KCl, and 25 wt %-27 wt % of $MgCl_2$.

In some specific embodiments, the method also comprises: recovering the carnallite saturated solution obtained in step (4) for preparing low-sodium carnallite by evaporation in step (3).

Further, the amount of the fresh water in step (4) is 1.1-1.2 times of the amount calculated by a phase diagram.

In some specific embodiments, a mass ratio of the fresh water to the artificial sylvine in step (5) is 0.7:1-1:1.

Further, the crude potassium chloride contains 85 wt %-90 wt % potassium chloride.

Further, the sylvine saturated solution comprises the following components in percentage by weight: 18 wt %-20 wt % of NaCl and 7 wt %-11 wt % of KCl.

Further, the method also comprises: recovering the sylvine saturated solution obtained in step (5) for mixing brine in step (2).

In some specific embodiments, the refining treatment in step (5) comprises washing and drying the obtained crude potassium chloride.

Further, a washing solution used by the washing treatment comprises fresh water.

Further, a liquid-to-solid mass ratio of the washing solution to the crude potassium chloride is 0.20:1-0.25:1.

Further, the temperature of the washing treatment is 10° C.-25° C.

Further, the method also comprises: recovering refined potassium mother liquor generated by the washing treatment for low-temperature selective dissolution treatment of artificial sylvine in step (5).

Figure 6:
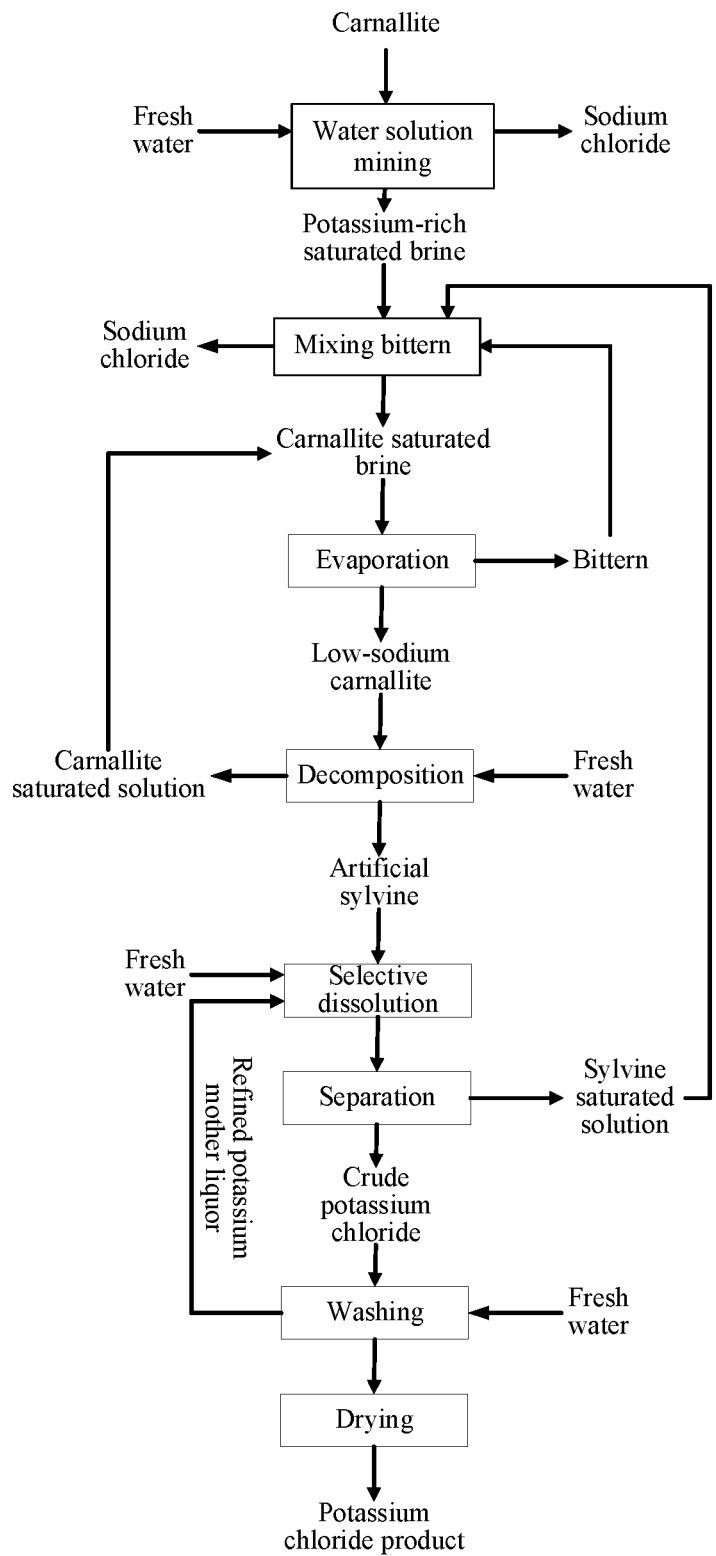
FIG. 6 is a flowchart of a method for preparing potassium chloride from carnallite in an embodiment of the present application.

Where, as one of more specific embodiments of the present application, as shown in FIG. 6, the method for preparing potassium chloride from carnallite specifically comprises the following steps:

(1) stage I: carnallite is mined by using a fresh water solution method to obtain potassium-rich saturated brine. In order to improve the mining speed, mining is conducted with hot water, the temperature of the dissolved brine is controlled at 40° C.-50° C.; the mass ratio of fresh water to carnallite is controlled to 0.25:1-1.20:1, the fresh water mass ratio decreases with the increase of the content of sodium chloride in carnallite, and the ratio is reduced to (0.15-0.20 fresh water mass ratio)/(10 wt % NaCl). The potassium-rich saturated brine comprises 7 wt %-11 wt % of NaCl, 7.5 wt %-9.5 wt % of KCl and 11 wt %-15.5 wt % of $MgCl_2$.

(2) Stage II: the potassium-rich saturated brine, the sylvine saturated solution and bittern are mixed to precipitate out sodium chloride, and the carnallite saturated brine is remained. The temperature of mixing brine is the same as that of the potassium-rich saturated brine; a mass ratio of (potassium-rich saturated brine+sylvine saturated solution) to bittern is controlled to 1:1.1-1:1.7, and the higher the content of sodium chloride in potassium-rich brine, the larger the amount of bittern; the bittern can be obtained by evaporating the brine in the later stage without separate preparation. The obtained carnallite saturated brine comprises 1.6 wt %-1.8 wt % of NaCl, 4.0 wt %-4.5 wt % of KCl and 26.5 wt %-27.0 wt % of $MgCl_2$.

Stage III: the carnallite saturated brine is evaporated to obtain low-sodium carnallite and bittern. The evaporation temperature is controlled to be the same as that of the carnallite saturated brine; when the residual solution comprises 0.4 wt %-0.5 wt % of NaCl, 0.20 wt %-0.25 wt % of KCl and 36 wt %-37 wt % of $MgCl_2$, evaporation stops. Solid-liquid separation is conducted, the residual solution at this time is bittern, and all of the bittern is recycled to stage II for mixing brine; the precipitated solid phase comprises 9 wt %-10 wt % of NaCl, 20 wt %-22 wt % of KCl and 32 wt %-35 wt % of $MgCl_2$, which is low-sodium carnallite.

(4) Stage IV: the low-sodium carnallite is decomposed with fresh water to obtain artificial sylvine and the carnallite saturated solution. The decomposition temperature is controlled at 10° C.-25° C., and the addition amount of fresh water is 1.1-1.2 times of the theoretical fresh water amount (the theoretical fresh water amount is calculated by a phase diagram). After solid-liquid separation, the obtained solid phase is artificial sylvine comprising 25 wt %-30 wt % of NaCl and 70 wt %-75 wt % of KCl; the liquid phase is the carnallite saturated solution comprising 1.5 wt %-2.0 wt % of NaCl, 2.5 wt %-3.5 wt % of KCl and 25 wt %-27 wt % of $MgCl_2$. The carnallite saturated solution is returned back to stage III for reuse.

(5) Stage V: the artificial sylvine is selectively dissolved with fresh water and refined potassium mother liquor to obtain crude potassium chloride. The dissolution temperature is controlled to be the same as the decomposition temperature in stage IV; a liquid-solid mass ratio of fresh water (or refined potassium mother liquor) to artificial sylvine is 0.7:1-1.0:1, in which all of sodium chloride and a part of potassium chloride enter the liquid phase, and the solid phase remained after solid-liquid separation is crude potassium chloride with a potassium chloride content of 85 wt %-90 wt %; the liquid phase is a sylvine saturated solution comprising 18 wt %-20 wt % of NaCl and 7 wt %-11 wt % of KCl. The sylvine saturated solution is returned to stage II for reuse.

(6) The crude potassium chloride is refined to produce a potassium chloride product. The crude potassium chloride is washed with fresh water and dried to finally obtain the potassium chloride product, wherein the liquid-solid mass ratio of fresh water added for washing to crude potassium chloride is 0.20:1-0.25:1, and the washing temperature is the same as the dissolution temperature in stage V. The refined potassium mother liquor obtained by washing is returned back to stage V for reuse.

In the present application, when actual conditions are allowable, water solution mining, mixing brine and evaporation processes in this technical solution are all conducted at higher temperatures; decomposition of carnallite, selective dissolution of artificial sylvine and refining of potassium chloride are still controlled to be conducted at low temperatures. Similarly, this replacement solution can achieve water solution mining of various carnallites and preparation of potassium chloride products.

In the present application, (1) by mining with hot water, the mass ratio of fresh water to carnallite is controlled to 0.25:1-1.20:1, the fresh water mass ratio decreases with the increase of the content of sodium chloride in carnallite, the ratio is reduced to (0.15-0.20 fresh water mass ratio)/(10 wt % NaCl), and the content of sodium chloride in potassium-rich saturated brine is reduced to the greatest extent while rapidly mining carnallite; (2) in the process of mixing brine, the mass ratio of (potassium-rich saturated brine+sylvine saturated solution) to bittern is controlled to 1:1.1-1:1.7, which not only rapidly obtains the low-sodium carnallite saturated brine and omits the halite and sylvine sections in the process of evaporation but also realizes the full utilization of bittern in the later stage, thereby avoiding the environment hazard caused by discharge of bittern; (3) the artificial sylvine is subjected to low-temperature selective dissolution only once to prepare potassium chloride, so that the yield of potassium chloride in this stage is up to 70%-80% without using cyclic thermal dissolution-cold crystallization treatment again.

Next, the technical solution of the present application will be further illustrated in detail in combination with several preferred embodiments and drawings. This example will be conducted in the premise of the technical solution of the present application and gives detailed implementation modes and specific operation processes, however, the protective scope of the present application is not limited to the following examples.

Experimental materials used in the following examples, unless specially stated, are all purchased by conventional biochemical reagent companies.

The following examples (examples 1-3) are all obtained by the following steps:

(1) carnallite was mined with a fresh water solution method to obtain potassium-rich saturated brine.

(2) The potassium-rich saturated brine, a sylvine saturated solution and bittern were mixed to precipitate out sodium chloride and remain carnallite saturated brine. The brine mixing temperature was the same as that of the potassium-rich saturated brine; the mass ratio of (potassium-rich saturated brine+sylvine saturated solution) to bittern was controlled, and the higher the content of sodium chloride in potassium-rich brine, the larger the amount of bittern; the bittern was obtained by evaporating the brine in the later stage without separate preparation.

(3) The carnallite saturated brine was evaporated to obtain low-sodium carnallite and bittern. The evaporation temperature was controlled to be the same as that of the carnallite saturated brine; solid-liquid separation was conducted, and the remained solution at this moment was bittern all of which was reused to step (2) for mixing brine.

(4) The low-sodium carnallite was decomposed with fresh water to obtain artificial sylvine and a carnallite saturated solution. The carnallite saturated solution was returned back to step (3) for reuse.

(5) The artificial sylvine was selectively dissolved with fresh water and refined potassium mother liquor to obtain crude potassium chloride. The sylvine saturated solution was returned back to step (2) for reuse.

(6) The crude potassium chloride was refined to produce a potassium chloride product. The crude potassium chloride was washed with fresh water and dried to finally obtain the potassium chloride product. The washing temperature was the same as the dissolution temperature in step (5). The refined potassium mother liquor obtained by washing was returned back to step (5) for reuse.

Example 1

| | | Mass composition/% | | | |
|---|---|---|---|---|---|
| Stage | Name | NaCl | KCl | MgCl$_2$ | H$_2$O |
| Water solution mining | Carnallite | 48 | 10.5 | 19.5 | 22 |
| | Liquid-solid mass ratio of water solution mining fresh water to carnallite | | 0.25:1 | | |
| | Temperature of potassium-rich saturated brine | | 50° C. | | |
| | Composition of potassium-rich saturated brine | 7 | 8.4 | 15.5 | 69.1 |
| Mixing brine | Mass ratio of potassium-rich saturated brine to bittern | | 1:1.1 | | |
| | Brine mixing temperature | | 50° C. | | |
| | Carnallite saturated brine | 1.8 | 4.5 | 27 | 66.7 |
| Evaporation of carnallite saturated brine | Evaporation temperature | | 50° C. | | |
| | Bittern | 0.5 | 0.25 | 37 | 62.25 |
| | Low-sodium carnallite | 10 | 22 | 35 | 33 |
| Decomposition of low-sodium carnallite | Decomposition temperature | | 25° C. | | |
| | Addition amount of fresh water | | 1.2 times of theoretical fresh water amount | | |
| | Artificial sylvine | 30 | 70 | 0 | 0 |
| | Carnallite saturated solution | 2 | 3.5 | 27 | 67.5 |
| Selective dissolution of artificial sylvine | Dissolution temperature | | 25° C. | | |
| | Mass ratio of fresh water to artificial sylvine | | 0.7:1 | | |
| | Crude potassium chloride | 10 | 90 | 0 | 0 |
| | Sylvine saturated solution | 20 | 11 | 0 | 69 |
| Refining of crude potassium chloride | Washing temperature | | 25° C. | | |
| | Mass ratio of fresh water to crude potassium chloride | | 0.2:1 | | |
| | Potassium chloride product | 2 | 96 | 0 | 2 |
| Total yield of potassium chloride | | | 90% | | |

Example 2

| | | Mass composition/% | | | |
|---|---|---|---|---|---|
| Stage | Name | NaCl | KCl | MgCl$_2$ | H$_2$O |
| Water solution mining | Carnallite | 19.5 | 16.5 | 30 | 34 |
| | Liquid-solid mass ratio of water solution mining fresh water to carnallite | | 1.2:1 | | |
| | Temperature of potassium-rich saturated brine | | 40° C. | | |
| | Composition of potassium-rich saturated brine | 10 | 7.5 | 13.5 | 69 |
| Mixing brine | Mass ratio of potassium-rich saturated brine to bittern | | 1:1.3 | | |
| | Brine mixing temperature | | 40° C. | | |
| | Carnallite saturated brine | 1.6 | 4 | 26.5 | 67.9 |
| Evaporation of carnallite saturated brine | Evaporation temperature | | 40° C. | | |
| | Bittern | 0.4 | 0.2 | 36 | 63.4 |
| | Low-sodium carnallite | 9 | 20 | 32 | 39 |

| Stage | Name | Mass composition/% | | | |
|---|---|---|---|---|---|
| | | NaCl | KCl | MgCl$_2$ | H$_2$O |
| Decomposition of low-sodium carnallite | Decomposition temperature | 10° C. | | | |
| | Addition amount of fresh water | 1.1 times of theoretical fresh water amount | | | |
| | Artificial sylvine | 25 | 75 | 0 | 0 |
| | Carnallite saturated solution | 1.5 | 2.5 | 25 | 71 |
| Selective dissolution of artificial sylvine | Dissolution temperature | 10° C. | | | |
| | Mass ratio of fresh water to artificial sylvine | 1:1 | | | |
| | Crude potassium chloride | 15 | 85 | 0 | 0 |
| | Sylvine saturated solution | 18 | 7 | 0 | 75 |
| Refining of crude potassium chloride | Washing temperature | 10° C. | | | |
| | Mass ratio of fresh water to crude potassium chloride | 0.25:1 | | | |
| | Potassium chloride product | 4 | 92 | 0 | 4 |
| Total yield of potassium chloride | | 92% | | | |

Example 3

| Stage | Name | Mass composition/% | | | |
|---|---|---|---|---|---|
| | | NaCl | KCl | MgCl$_2$ | H$_2$O |
| Water solution mining | Carnallite | 31.5 | 19.5 | 23 | 26 |
| | Liquid-solid mass ratio of water solution mining fresh water to carnallite | 1:1 | | | |
| | Temperature of potassium-rich saturated brine | 45° C. | | | |
| | Composition of potassium-rich saturated brine | 9.5 | 9.5 | 11 | 70 |
| Mixing brine | Mass ratio of potassium-rich saturated brine to bittern | 1:1.7 | | | |
| | Brine mixing temperature | 45° C. | | | |
| | Carnallite saturated brine | 1.7 | 4.2 | 26.8 | 67.3 |
| Evaporation of carnallite saturated brine | Evaporation temperature | 45° C. | | | |
| | Bittern | 0.45 | 0.23 | 36.5 | 62.82 |
| | Low-sodium carnallite | 9.5 | 21 | 34 | 35.5 |
| Decomposition of low-sodium carnallite | Decomposition temperature | 15° C. | | | |
| | Addition amount of fresh water | 1.15 times of theoretical fresh water amount | | | |
| | Artificial sylvine | 27 | 73 | 0 | 0 |
| | Carnallite saturated solution | 1.7 | 3 | 26 | 69.3 |
| Selective dissolution of artificial sylvine | Dissolution temperature | 15° C. | | | |
| | Mass ratio of fresh water to artificial sylvine | 0.9:1 | | | |
| | Crude potassium chloride | 12 | 88 | 0 | 0 |
| | Sylvine saturated solution | 19 | 8.5 | 0 | 72.5 |
| Refining of crude potassium chloride | Washing temperature | 15° C. | | | |
| | Mass ratio of fresh water to crude potassium chloride | 0.23:1 | | | |
| | Potassium chloride product | 3 | 94 | 0 | 3 |
| Total yield of potassium chloride | | 95% | | | |

In addition, the inventors of this case also conduct tests with other raw materials, technological operations and technological conditions mentioned in this specification with reference to the foregoing examples, and relatively ideal results are obtained.

Various aspects, embodiments, features and examples of the present application should be deemed as be illustrative in all aspects, and are not intended to limit the present application, and the scope of the present application is defined by claims. Those skilled in the art will understand other samples, amendments and uses without departing from the spirit and scope of the present application.

The use of the title and sections in the present application is not meant to limit the present application; each section can be applied to any aspects, embodiments or features of the present application.

Throughout the present application, where a composition is described as having, comprising or including particular components, or where a process is described as having, comprising or including particular process steps, it is contemplated that the processes taught herein also essentially consist of or consist of the described process steps.

It should be understood that the order of steps or order in which particular actions are performed is not extremely important, so long as the teachings of the present application remain operable. Furthermore, two or more two steps or actions can be simultaneously performed.

Although the present application has been described with reference to illustrative embodiments, those skilled in the art will understand that various other changes, omissions and/or additions can be made without departing from the spirit and scope of the present application, and substantive equivalents can be used to replace elements in embodiments. In addition, many amendments can be made without departing from the scope of the present application so that specific situations or materials are suitable for the teachings of the present application. Therefore, it is intended herein to include all the embodiments within the scope of the appended claims of the present application but not limit the present application to implement the particular embodiments disclosed by the present application. Furthermore, unless specifically stated, any use of terms first, second and the like does not denote any order or importance, but rather the terms first, second and the like are used to distinguish one element from another element.

What is claimed is:

1. A method for preparing potassium chloride from a carnallite, comprising:
   (1) contacting a preheated fresh water with the carnallite in a water solution mining treatment to obtain a potassium-rich saturated brine, wherein a temperature of the potassium-rich saturated brine is 40° C.-50° C.; wherein the potassium-rich saturated brine comprises the following components in percentage by weight: 7 wt %-11 wt % of NaCl, 7.5 wt %-9.5 wt % of KCl, and 11 wt %-15.5 wt % of $MgCl_2$; a mass ratio of a fresh water to the carnallite is 0.25:1-1.20:1; in a process of the water solution mining treatment, the mass ratio of the fresh water to the carnallite is reduced by 0.15-0.20 when a content of sodium chloride in the carnallite is increased by 10 wt %;
   (2) mixing the potassium-rich saturated brine, a sylvine saturated solution, and a bittern at 40° C.-50° C. for mixing brine to obtain a carnallite saturated brine and sodium chloride; wherein the carnallite saturated brine comprises the following components in percentage by weight: 1.6 wt %-1.8 wt % of NaCl, 4.0 wt %-4.5 wt % of KCl, and 26.5 wt %-27.0 wt % of $MgCl_2$;
   (3) evaporating the carnallite saturated brine at 40° C.-50° C., and then carrying out a solid-liquid separation to obtain a low-sodium carnallite and the bittern; wherein the low-sodium carnallite comprises the following components in percentage by weight: 9 wt %-10 wt % of NaCl, 20 wt %-22 wt % of KCl, and 32 wt %-35 wt % of $MgCl_2$;
   (4) carrying out a fresh water decomposition treatment on the low-sodium carnallite at 10° C.-25° C., and then carrying out the solid-liquid separation to obtain an artificial sylvine and a carnallite saturated solution, wherein the artificial sylvine comprises the following components in percentage by weight: 25 wt %-30 wt % of NaCl and 70 wt %-75 wt % of KCl; and
   (5) carrying out a selective dissolution treatment on the artificial sylvine with the fresh water at 10° C.-25° C. to obtain a crude potassium chloride and a statured sylvine solution, and then refining to obtain a potassium chloride; wherein a mass ratio of the fresh water to the artificial sylvine is 0.7:1-1:1.

2. The method for preparing the potassium chloride from the carnallite according to claim 1, wherein a ratio of a total mass of the potassium-rich saturated brine and the sylvine saturated solution to a mass of the bittern is 1:1.1-1:1.7.

3. The method for preparing the potassium chloride from the carnallite according to claim 1, wherein the bittern in step (3) comprises the following components in percentage by weight: 0.4 wt %-0.5 wt % of NaCl, 0.20 wt %-0.25 wt % of KCl, and 36 wt %-37 wt % of $MgCl_2$.

4. The method for preparing the potassium chloride from the carnallite according to claim 1, wherein the carnallite saturated solution in step (4) comprises the following components in percentage by weight: 1.5 wt %-2.0 wt % of NaCl, 2.5 wt %-3.5 wt % of KCl, and 25 wt %-27 wt % of $MgCl_2$.

5. The method for preparing the potassium chloride from the carnallite according to claim 1, further comprising: recovering the carnallite saturated solution obtained in step (4) for preparing the low-sodium carnallite by an evaporation in step (3).

6. The method for preparing the potassium chloride from the carnallite according to claim 1, wherein a content of the potassium chloride in the crude potassium chloride in step (5) is 85 wt %-90 wt %.

7. The method for preparing the potassium chloride from the carnallite according to claim 1, wherein the refining treatment in step (5) comprises: washing and drying the crude potassium chloride.

8. The method for preparing the potassium chloride from the carnallite according to claim 7, wherein a washing solution used by the washing is selected from the fresh water; a liquid-to-solid mass ratio of the washing solution to the crude potassium chloride is 0.20:1-0.25:1; a temperature of the washing is 10° C.-25° C.

9. The method for preparing the potassium chloride from the carnallite according to claim 8, further comprising: recovering a refined potassium mother liquor generated by the washing for the selective dissolution treatment of the artificial sylvine in step (5).

10. The method for preparing the potassium chloride from the carnallite according to claim 1, further comprising: recovering the bittern obtained in step (3) for mixing brine in step (2).

11. The method for preparing the potassium chloride from the carnallite according to claim 1, wherein the sylvine saturated solution in step (5) comprises the following components in percentage by weight: 18 wt %-20 wt % of NaCl and 7 wt %-11 wt % of KCl.

12. The method for preparing the potassium chloride from the carnallite according to claim 1, further comprising: recovering the sylvine saturated solution obtained in step (5) for mixing brine in step (2).

* * * * *